United States Patent [19]
Freund et al.

[11] Patent Number: 5,925,098
[45] Date of Patent: Jul. 20, 1999

[54] APPARATUS AND METHOD FOR DISPATCHING CLIENT METHOD CALLS WITHIN A SERVER COMPUTER SYSTEM

[75] Inventors: Thomas Freund, Winchester; Simon Antony James Holdsworth, Andover; Iain Stuart Caldwell Houston, Bradford Abbas, all of United Kingdom

[73] Assignee: International Business Machines Corporation, Armonk, N.Y.

[21] Appl. No.: 08/855,776

[22] Filed: May 12, 1997

[30] Foreign Application Priority Data

Dec. 20, 1996 [GB] United Kingdom ............. 9626602

[51] Int. Cl.⁶ .................................................. G06F 9/44

[52] U.S. Cl. ............................................. 709/203; 710/5

[58] Field of Search .................. 395/800.25, 676, 395/672, 684, 200.33; 707/3; 709/203

[56] References Cited

U.S. PATENT DOCUMENTS

| | | | |
|---|---|---|---|
| 5,452,459 | 9/1995 | Drury et al. ............................ | 395/700 |
| 5,463,625 | 10/1995 | Yasrebi ................................. | 370/401 |
| 5,560,029 | 9/1996 | Papadopoulos et al. .......... | 395/800.25 |
| 5,692,193 | 11/1997 | Jagannathan et al. ................. | 395/676 |

*Primary Examiner*—Ellis B. Ramirez
*Assistant Examiner*—William Titcomb
*Attorney, Agent, or Firm*—Kevin J. Fournier; Bernard D. Bogdon

[57] ABSTRACT

An apparatus for dispatching client requests within a server computer system, wherein the client requests are issued from at least one client computer system on a different platform from said server computer system and are passed through a communications channel to said server computer system, the apparatus comprising: a buffer having an input connected to said communications channel and an output; a plurality of parallel execution threads connected to said output of said buffer; and a scheduling means for distributing client requests stored in said buffer to said plurality of execution threads in a manner such that related client requests are sent to the same execution thread.

7 Claims, 4 Drawing Sheets

APPARATUS AND METHOD FOR DISPATCHING CLIENT METHOD CALLS WITHIN A SERVER COMPUTER SYSTEM

FIELD OF THE INVENTION

The invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying about how the client application's work requests will be communicated to and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Application 0 677,943 A2. These latter two publications are hereby incorporated by reference. However, an example, of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines Corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM Corp.).

When the client computer 10 wishes to make a request for the server computer 20's services, the first application program 40 informs the first logic means 50 of the service required. It may, for example, do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object on the server 20, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects. The OMG has set forth published standards by which client computers (e.g. 10) communicate (in OOP form) with server machines (e.g. 20). As part of these standards, an Object Request Broker has been defined, which provides the object-oriented bridge between the client and the server machines. The ORB decouples the client and server applications from the object oriented implementation details, performing at least part of the work of the first and second logic means 50 and 90 as well as the connection means 80.

Once client requests find their way through the ORB and into the server computer 20, the ORB finds a particular server object capable of executing the request and sends the request to that server object's Object Adapter (also defined by OMG standard) where it is stored in the Object Adapter's queue (buffer) to await processing by the server object. The buffer is a First-In-First-Out queue, meaning that the first request received in the buffer at one end thereof is the first to leave out the other end. The server object has a plurality of parallel "execution threads" upon any of which it can run an instance of itself. In this way, the server object is able to process similar requests from different clients at the same time. The Object Adapter looks to see which of the parallel execution threads is ready to process another request and assigns the request located at the end of the buffer to the next available execution thread. This is explained in the above-mentioned U.S. patent as a "dispatching" mechanism whereby the server dispatches queued requests to execution threads.

This architecture has worked fine for instances where a client computer 10 wishes a server computer 20 to perform a "one-shot" work item (meaning the client computer will probably not require that particular server to do further work after the server returns the processing result). Since there is no need for a relationship to exist between the various client requests stored in a particular server's FIFO buffer, the next available execution thread can simply be given the next output of the buffer.

However, there are other client/server applications which are not "one-shot" in nature and require a continued relationship between a particular client machine 10 and a particular server machine 20. An example of such applications is the processing of "transactions".

Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g. 10) communicating with one particular server computer (e.g. 20) over a series of client requests which are processed by the server.

If the client and server machines are located on heterogeneous platforms, the object-oriented architecture of FIG. 1 could be used as the distributed processing environment. However, the standard OMG Object Adapter/Object Request Broker architecture using the FIFO buffer and sending the oldest stored request to the next available execution thread within the server will not give good results. If two transactionally related requests are processed by different execution threads of the server, the execution environment for each request will be different and consistent overall results can thus not be achieved. The results of the first executed request will not be made available while processing a next executed request which is part of the same transaction. For example, these two requests could be being processed simultaneously by two different execution threads within the server.

This problem has greatly dissuaded the use of heterogeneous client/server systems to process distributed transactions (and other processing contexts in which related requests are involved), leaving such distributed transactions to be processed on homogeneous client/server architectures (such as computer terminals accessing host mainframe computers) so that a consistent execution environment is provided to produce guaranteed results.

SUMMARY OF THE INVENTION

According to one aspect, the present invention provides an apparatus for dispatching client requests within a server computer system, wherein the client requests are issued from at least one client computer system on a different platform from said server computer system and are passed through a communications channel to said server computer system, the apparatus comprising: a buffer having an input connected to said communications channel and an output; a plurality of parallel execution threads connected to said output of said buffer; and a scheduling means for distributing client requests stored in said buffer to said plurality of execution threads in a manner such that related client requests are sent to the same execution thread.

Accordingly, client requests that are related can be processed on the same execution thread, thus allowing related requests to be processed under the same execution conditions, greatly enhancing the predictability of processing result which is returned to the client computer.

Preferably, the scheduling means schedules transactionally related client requests to the same execution thread and the buffer is included within an Object Adapter. Further preferably, the scheduling means interacts with the server computer system's Object Request Broker Object Transaction Service to obtain transaction data concerning each request when scheduling requests.

According to another aspect, the present invention provides a method of dispatching client requests to a plurality of parallel execution threads within a server computer device, said requests originating from at least one client computer device located on a different platform from said server computer device, said method including steps of: determining information about each incoming request; and scheduling the processing of at least one incoming request to a particular execution thread based on said determining step.

Preferably, the determining step determines the transaction context of at least one request and further preferably the determined transaction context is used in said scheduling step to schedule all transactionally related requests to the same execution thread.

According to another aspect, the present invention provides a server computer apparatus including a dispatcher for dispatching client requests, wherein the client requests are issued from at least one client computer apparatus on a different platform from said server computer apparatus and are passed through a communications channel to said server computer apparatus, the dispatcher comprising: a buffer having an input connected to said communications channel and an output; a plurality of parallel execution threads connected to said output of said buffer; and a scheduling means for distributing client requests stored in said buffer to said plurality of execution threads in a manner such that related client requests are sent to the same execution thread.

According to another aspect, the present invention provides a client/server computer system including a server computer apparatus having a dispatcher for dispatching client requests, wherein the client requests are issued from at least one client computer apparatus on a different platform from said server computer apparatus and are passed through a communications channel to said server computer apparatus, the dispatcher comprising: a buffer having an input connected to said communications channel and an output; a plurality of parallel execution threads connected to said output of said buffer; and a scheduling means for distributing client requests stored in said buffer to said plurality of execution threads in a manner such that related client requests are sent to the same execution thread.

DETAILED DESCRIPTION OF THE PREFERRED EMBODIMENTS

Figure 1:
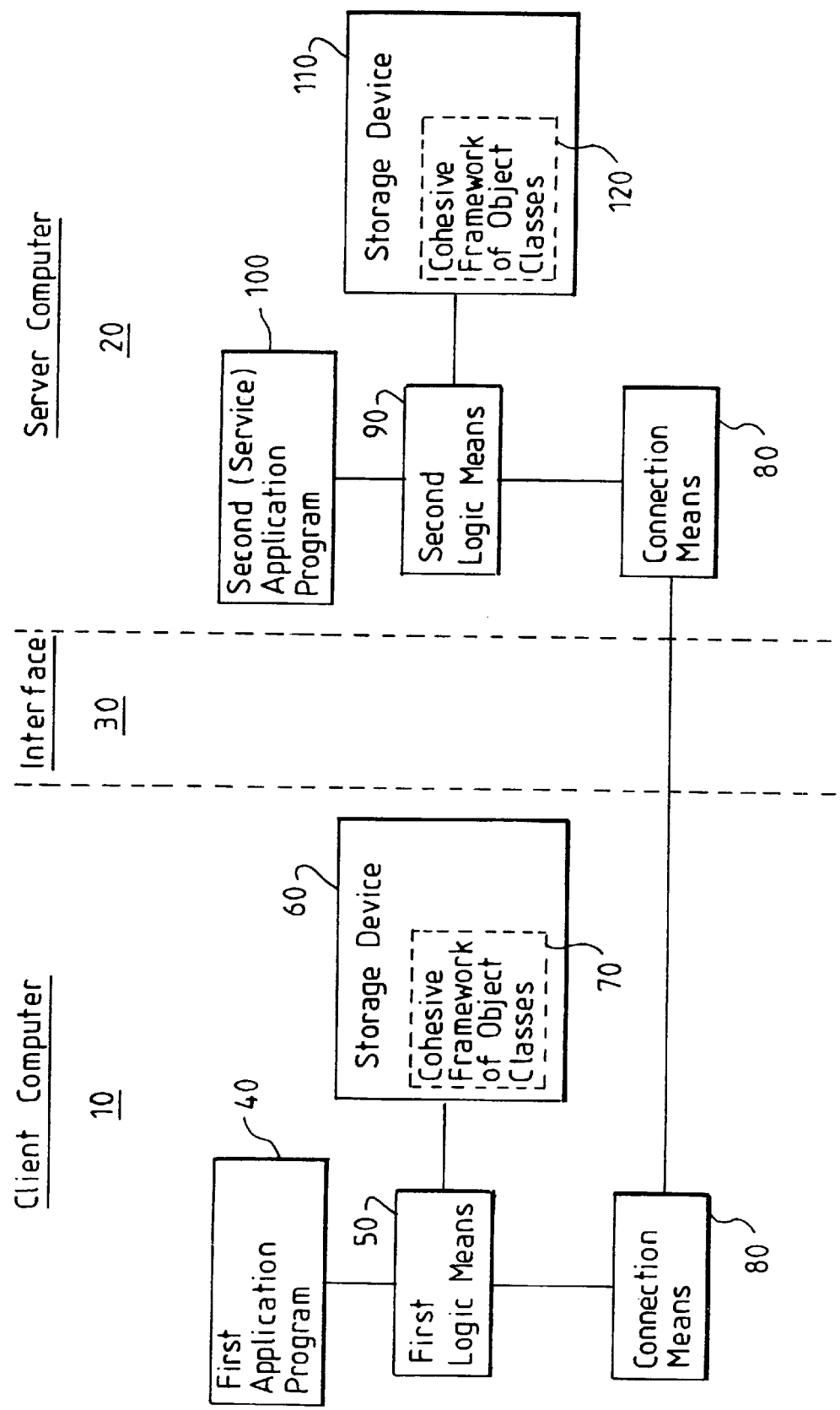
FIG. 1 is a block diagram of a well-known heterogeneous client/server architecture using object technology, in the context of which the preferred embodiments of the present invention are applied.
Figure 2:
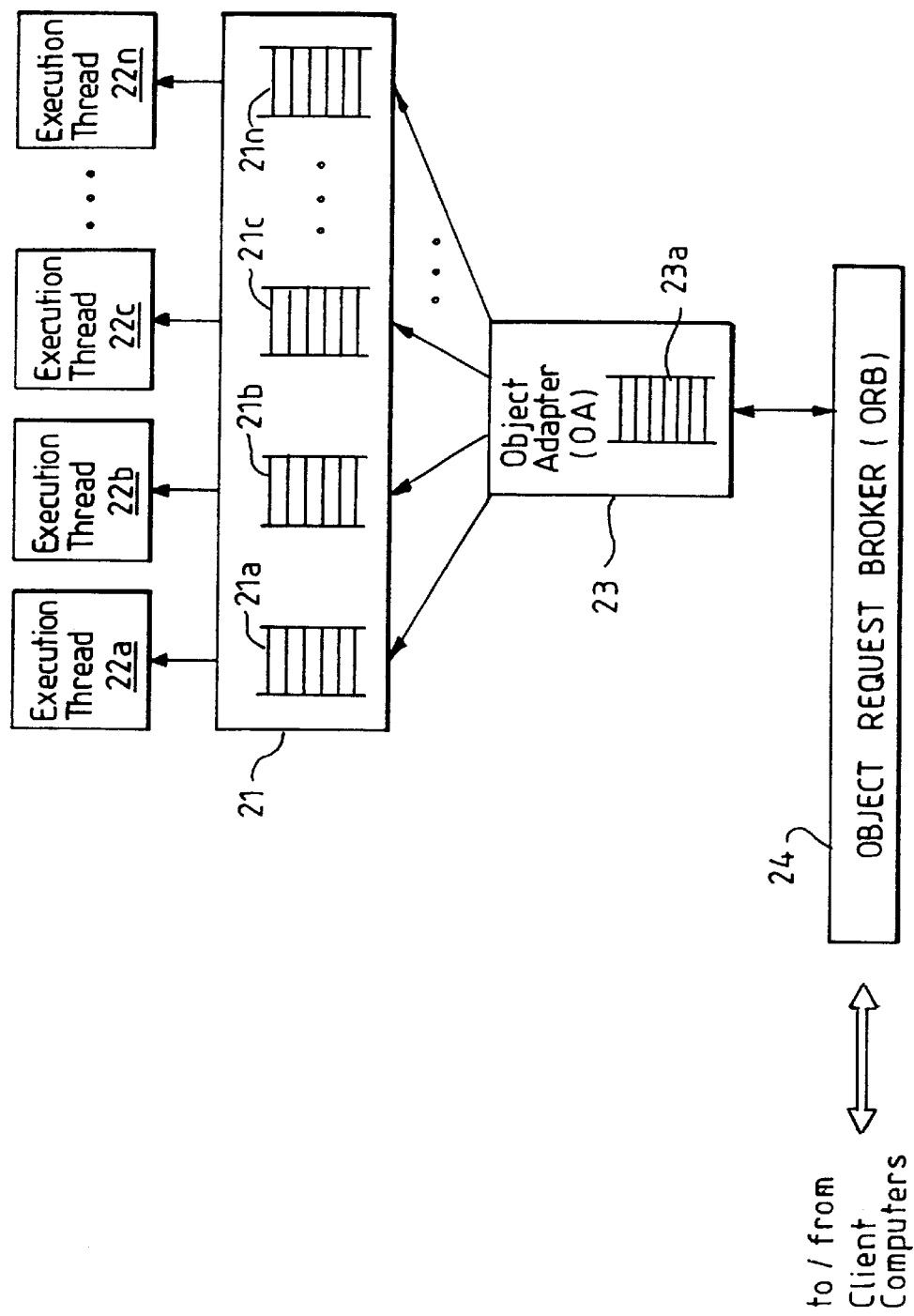
FIG. 2 is a block diagram of a server architecture according to a first embodiment of the present invention.

A first embodiment of the server architecture (FIG. 2) involves the placing of a group 21 of FIFO queues 21a–21n with one request queue assigned to each execution thread 22a–22n in a one-to-one relationship. According to this embodiment, when client requests are received by the server's Object Adapter 23 over the Object Request Broker 24 from a client computer system, the Object Adapter 23 examines the contents of each request contained on its received request FIFO buffer 23a. Based on such contents the requests can then be forwarded on to the appropriate request queue 21a–21n. For example, if a first received client request relates to a particular transaction and a second received client request relates to a different transaction, the first request can be assigned to queue 21a (and its corresponding execution thread 22a) and the second request can be assigned to queue 21b (and its corresponding execution thread 22b). Then, if a third received transaction request relates to the same transaction as the first request, the object adapter 23 would recognize this and assign this third request to the queue 21a to be processed by execution thread 22a.

In this way, a complete transaction consisting of many separate (but related) requests can be executed by the same execution thread, thus providing the same execution environment for each transactionally related request.

Figure 3:
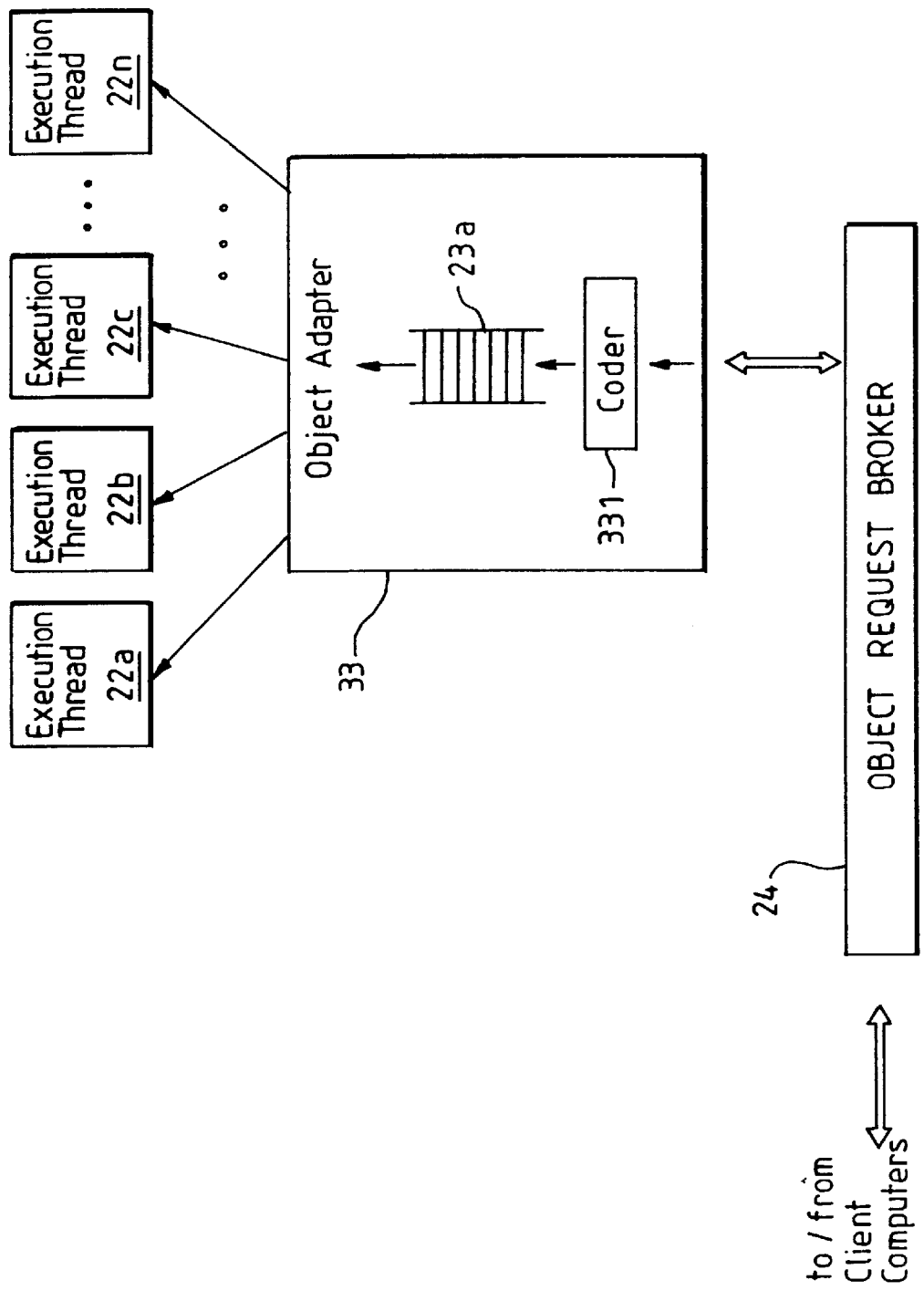
FIG. 3 is a block diagram of a server architecture according to a second embodiment of the present invention.

According to a second embodiment (FIG. 3), a coder 331 located inside the Object Adapter 33 adds a code to each request to identify requests as belonging to a particular transaction. Then, the coded requests are sent onto the request queue 23a from the output of the coder 331. The request queue 23a is a FIFO queue. The Object Adapter 33 takes out the requests from the queue in the order in which they were received and examines the codes. The Object Adapter 33 then sends the requests to the appropriate execution thread (22a to 22n) based on the codes.

For example, if a first request comes across the Object Request Broker 24 from one client machine and belongs to a first transaction this request will be coded by coder 331 by adding a code identifying the request as part of a specific transaction (e.g., transaction identification number 1). The coded transaction is then stored in the queue 23a. The next request received by Object Request Broker 24 is from a different client machine and belongs to a different (second) transaction. The coder 331 codes this request by adding a code identifying the request as part of the second transaction (e.g., transaction identification number 2). Then, if a third request received by Object Request Broker 24 is from the first client machine and is part of the first transaction, Object Adapter 33 recognizes this fact from the request contents and, at coder 331, adds a code identifying the request as part of the first transaction (e.g., transaction identification number 1). Note that the first request and the third request are coded by coder 331 in the same way because they both belong to the same transaction.

Then, Object Adapter queue 23a contains the three requests, and when they reach the top of the queue, the requests are analyzed with respect to their codes and sent to appropriate execution threads. That is, the first request is sent to execution thread 22a. The second request is sent to execution thread 22b. And, the third request is sent to execution thread 22a. The first and third requests are sent to the same execution thread 22a because the execution environment for these two requests should be the same, as they are both part of the same transaction. The second request is sent to a different execution thread 22b because it is not part of the first transaction and creates its own execution environment on the separate thread 22b. Further received requests belonging to the second transaction will also be assigned to this thread 22b to be processed in the execution environment created by the second request.

Figure 4:
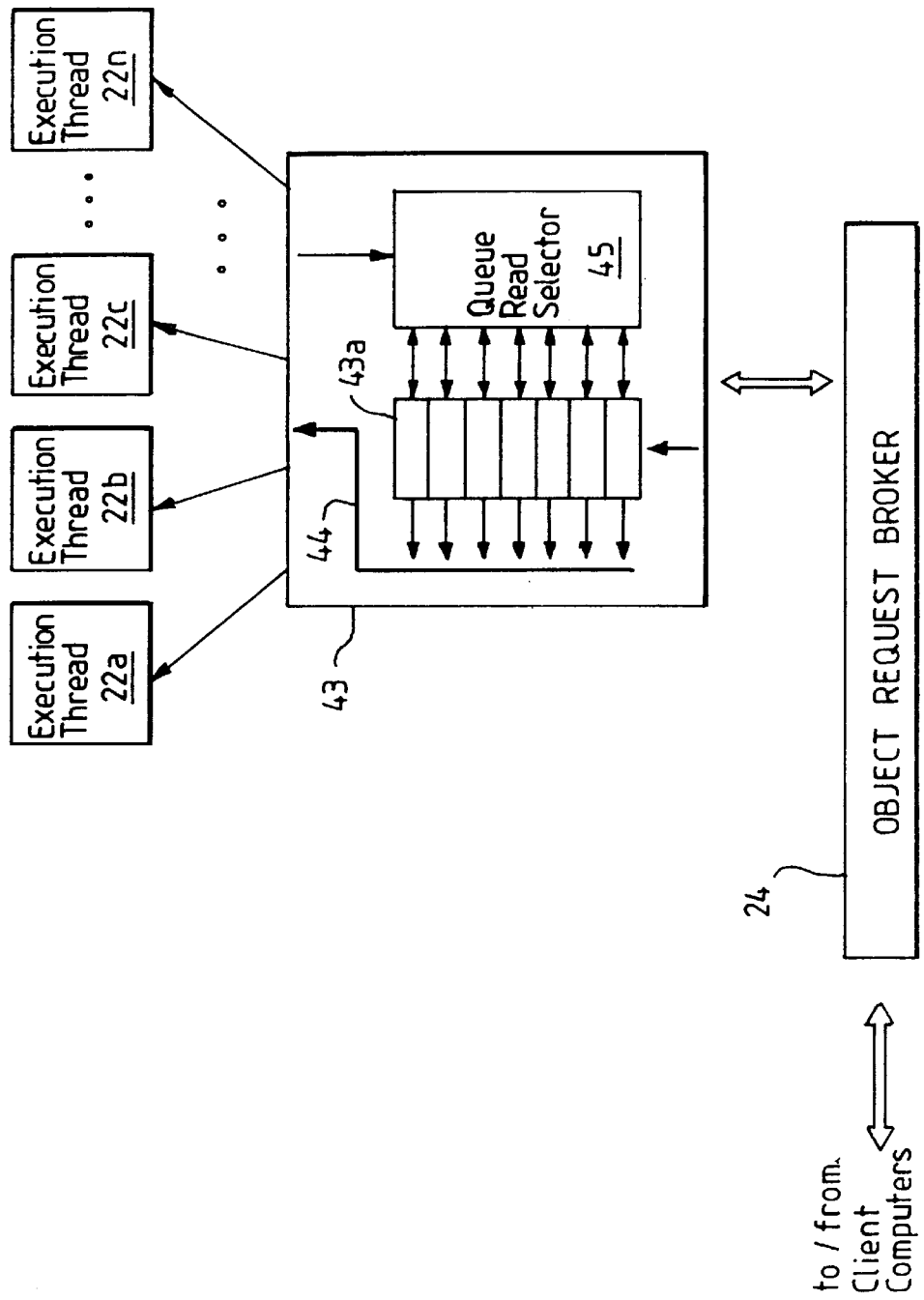
FIG. 4 is a block diagram of a server architecture according to a third embodiment of the present invention.

According to a third embodiment (FIG. 4), a different type of queue is used instead of a FIFO queue as in the previous embodiments and in the prior art. This queue 43a can be read from at various locations along the queue length, so that any request stored in the queue can be read out ahead of any other. Requests from client machines are, as usual, passed through the Object Request Broker 24 and into the Object Adapter 43's queue 43a in the order in which they are received. A Queue Read Selector 45 receives information from the execution threads 22a–22n regarding whether each thread is available to process another request. The Selector 45 also receives information concerning the various queued requests stored in queue 43a. Based on this information, Selector 45 sends read commands to queue 43a to dispatch requests to execution threads.

For example, as in the previous examples where the first and third requests belong to one transaction and the second belongs to another transaction, the Selector 45 gathers information from queue 43a that the first and third queued requests belong to the same transaction. Then, when execution thread 22a informs Selector 45 that it is ready to handle some more work, Selector 45 sends an appropriate read command to the addressable queue 43a so that the first request is sent along bus 44 to execution thread 22a (the thread that has just asked for another request). When execution thread 22a again asks for a request (signifying that it has finished processing the first request) Selector 45 sends a read command to the queue 43a so that the third request is output from the queue 43a and sent along bus 44 to execution thread 22a. In the meantime, when another execution thread (22b) asks Selector 45 for a request, Selector sends a read command to queue 43a so that the second request is output onto bus 44 and sent to execution thread 22b.

According to these various embodiments, a scheduling mechanism (which does not necessarily have to be located in the Object Adapter) ensures that all requests that are related (e.g. part of the same transaction) are sent to the same execution thread for processing. This ensures consistency during the processing of an entire set of related requests. That is, the client machine issuing a sequence of transactionally related requests of the server machine can expect to get the same answer back when it issues the same sequence of requests at a later time. The processing conditions of the server's execution environment will stay the same because of the scheduling mechanism. That is, intermediate requests belonging to another transaction (or not related to a transaction at all) are not allowed to be processed by the execution thread currently processing a transaction. If such intermediate requests were allowed to be processed on a transaction's execution thread, the execution environment would be different when later parts of the transaction are processed by the thread and consistent results to report back to the client would not be guaranteed.

In order to determine whether a request belongs to a transaction, and the specifics of the transaction if it does, the Object Request Broker (ORB) 24 interrogates the transaction context of each incoming request. The transaction context of a request is obtained by the ORB by using the OMG-established Object Transaction Service (OTS) [OMG document 94.8.4 published in 1994]. The ORB also interrogates the Object Reference and any Service Contexts of the request to determine the specific server object (and thus server application) which the request is wishing to invoke. Once the transaction context and server context/application are determined, the ORB sends the request to the appropriate Object Adapter's queue. From there, the scheduling mechanism, as described in the above embodiments, ensures that all transactionally related requests are sent to the same execution thread. Also, the scheduling mechanism can isolate the execution thread for a particular transaction by not allowing requests unrelated to that transaction from being processed on the transaction's assigned execution thread.

The present invention thus provides, to the distributed heterogeneous platform context, the types of workload management services required by today's commercial processing environments. A large number of users (clients) can thus be given efficient usage of the available resources through system-wide workload balancing. Also, individual users are provided with consistent results in terms of a guaranteed response and guaranteed processing time each time a client invokes a server application located on a heterogeneous platform.

We claim:

1. An apparatus for dispatching client requests within a server computer system, wherein the client requests are issued from at least one client computer system on a different platform from said server computer system and are passed through a communications channel to said server computer system, the apparatus comprising:

a buffer having an input connected to said communications channel and an output;

a plurality of parallel execution threads connected to said output of said buffer; and a scheduling means for distributing client requests stored in said buffer to said plurality of execution threads in a manner such that a first request is sent to a first execution thread for processing and a processing result is sent back over said channel to the client computer system that issued the first request, and the apparatus has also received over said channel into said buffer a second request related to said first request and said second request is sent to said first execution thread after said first execution thread has finished processing the first request and has sent back said processing result to the client computer system.

2. The apparatus of claim 1 wherein the scheduling means interacts with the server computer system's Object Request Broker Object Transaction Service to obtain transaction data concerning each request when scheduling requests.

3. The apparatus of claim 1 wherein said buffer is included within an Object Adapter.

4. The apparatus of claim 1 wherein said scheduling means schedules transactionally related client requests to the same execution thread.

5. The apparatus of claim 4 wherein said scheduling means comprises a plurality of queues, with one queue associated with a respective one of said plurality of parallel execution threads in a one-to-one relationship.

6. The apparatus of claim 4 wherein said scheduling means comprises a single queue associated with said plurality of execution threads and wherein related client requests are coded to indicate their relation.

7. The apparatus of claim 4 wherein said scheduling means comprises a single queue associated with said plurality of parallel execution threads and further comprising a selector for reading the queue and sending related client requests to the same execution thread.

* * * * *